UNITED STATES PATENT OFFICE.

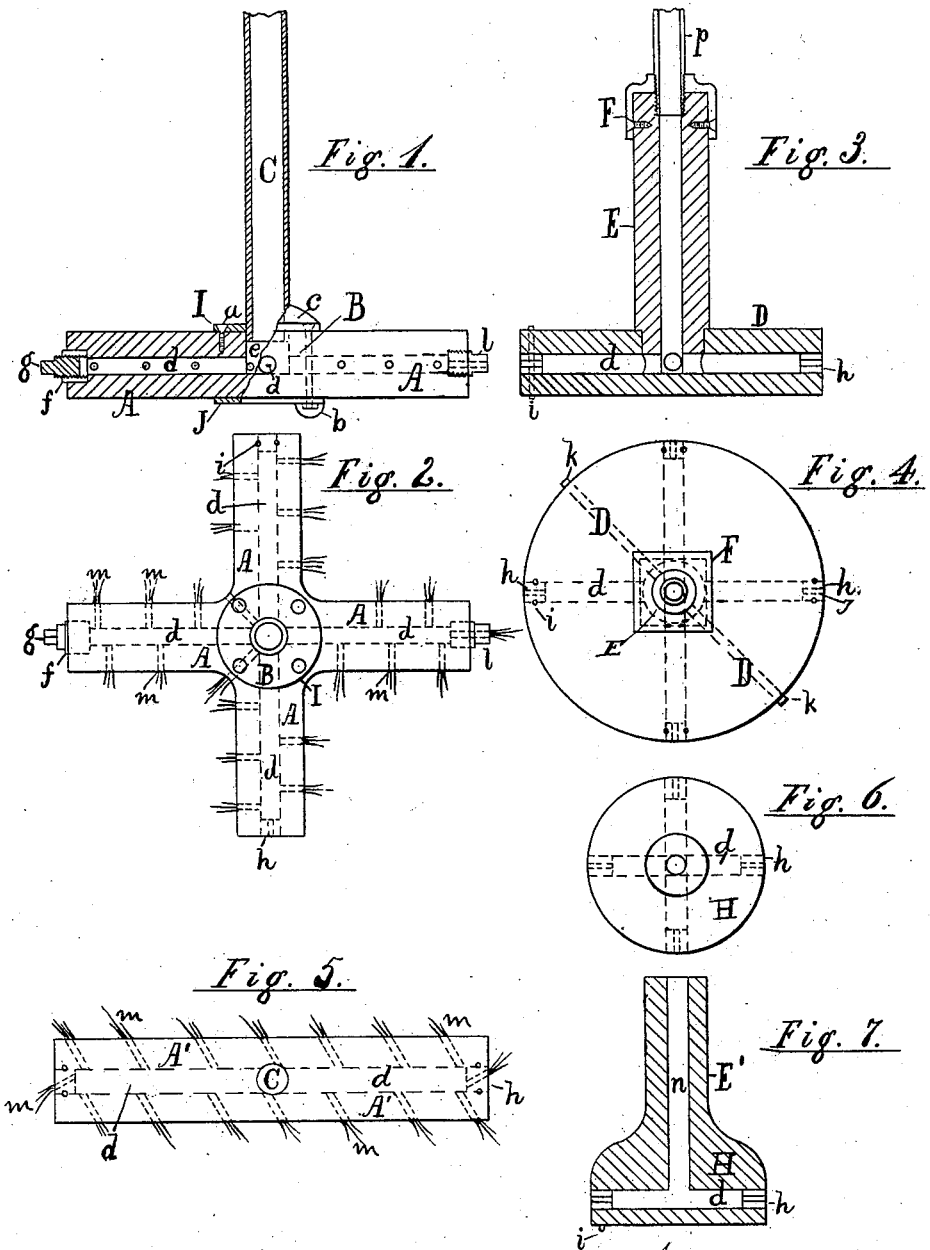

WILLIAM HOWARTH, OF NEWARK, NEW JERSEY.

IMPROVEMENT IN JET-HEATERS.

Specification forming part of Letters Patent No. 206,453, dated July 30, 1878; application filed June 13, 1878.

*To all whom it may concern:*

Be it known that I, WILLIAM HOWARTH, of Newark, in the county of Essex and State of New Jersey, have invented a new and useful Improvement in Jet-Heaters, which improvement is fully described in the following specification.

My invention relates to that class of heaters which are used for heating a tank, dye-vat, or other receptacle of liquid, by immersion therein and by the discharge of steam or other heated fluid from orifices in the heater, the steam itself being supplied to the heater by suitable connections to a steam-boiler, and is especially adapted for use in cases where the liquid to be heated contains acids or other ingredients which act upon iron, copper, and other metals usually injuriously used in the form of perforated pipes for this purpose. Lead, being less affected by such agents, has come to be generally used in hatters' dye-vats in the form of a perforated pot of heavy sheet or cast metal; but the holes are often eaten out by the combined action of the steam and dyes in a few weeks, and the vessel is discarded as incapable of repairs.

From the above facts it will be seen that a new material for the construction of such heaters is greatly desired, and I therefore construct my improved jet-heater of wood, and connect the steam-pipe to it in any desirable circulation is maintained, and the form of heater shown in Fig. 2 is the best adapted for this purpose, as experience shows that the direction of the jets agitates the water very uniformly, and brings the whole volume of water into speedy contact with the steam.

In Fig. 2 the heater is shown as made of a piece of wooden plank sawed into the form of a cross, and provided with a radial hole in each of its arms, from which apertures for the escape of steam pass outward at each side of the arm. Holes for the steam-jets may also be made at the ends of the arms and at the central hub. An opening in the hub connects, by a lead or wooden pipe, to an ordinary iron steam-pipe above the surface of the vat, the latter pipe being provided with a valve to regulate the flow of steam to the heater.

Fig. 1 shows the mode of connecting a lead pipe to the heater, and Fig. 3 the manner of securing a wooden pipe to the heater and to the steam-connection above.

In Fig. 2, A A A A are the radial arms; B, the central hub, which is made large enough to fit a lead flange, I, formed to screw to the wood, and soldered to the lead pipe C. The pipe C is shown passing a little way through the flange and entering a hole in the top of hub B.

*a* are screws to bind the flange to the wood;

ing to retain it in place, and a hole, $j$, being made through it, if desired.

As soon as the heater is immersed in water the wood swells at all the joints and makes them perfectly tight, and in practice a vacuum never forms in my heater, as it does in the metallic ones hitherto used, for the reason that the wood is a non-conductor, and, the fur from the hats being never drawn into the holes by such vacuum, the passages $d$ never require cleaning.

The jets from the holes $m$, which are made in each side of the arms A, are shown crossing one another, and make it evident that they would stir the water most effectually.

Fig. 4 shows the heater made of disk form; but in this the holes simply radiate from the center. In Fig. 4 is shown a wooden pipe, E, inserted into the disk D, and secured therein by two wooden pins, $k$, the upper end being fitted with a cast-iron cap, F, which is formed with a socket to strengthen the wood over which it fits.

The cap is secured to the pipe by screws through its sides, and a steam-pipe, P, is screwed into both the cap and the top of pipe E, so that a tight joint is secured with the wood. When constructed with the pipe E and wooden plugs $h$, the heater presents no metal whatever to the action of the water.

Figs. 6 and 7 also show a heater constructed entirely of wood, E' being the stem, made hollow at $n$, and H the bulb, which is turned out of a solid piece with the stem to avoid a joint between the two. The bulb is provided with radial holes $d$, and the stem is secured to its steam-pipe in any convenient manner.

From the above illustrations it will be seen that I can make my wooden heater in any form that may be preferred, or which may be required by the shape of the vessel in which the heater is to be used.

In an oblong vessel I use the heater as shaped in Fig. 5, with an elongated body, A', containing a channel, $d$, from end to end inside, and perforated at intervals with the jet-holes $m'$. If inclined to the sides of the body, as shown in the figure, the steam issuing from the holes will whirl the water around the sides of the vat or tub, and speedily heat the whole of it.

From the above description it may be seen that there are various advantages connected with the use of the material—wood—for this purpose which cannot be secured at all with any kind of metal, in addition to the great saving in cost effected by the use of wood, which, in practice, is seventy-five per cent. of the usual cost of a lead heater of the same heating power.

In heating cold water with the lead pots in common use, which are shaped like the bulb heater shown in Fig. 7, the greatest care has to be exercised in turning the steam into the heater, for the pot, being cold, condenses the steam very rapidly at first, and the metal, conducting heat readily, retains the low temperature of the liquid around it, while the steam gradually forces out the water contained in it, and then, coming in contact with the cold metal, the steam is often suddenly condensed, and a vacuum formed, which causes the collapse of the pot if much weakened by corrosion, and, if new, draws into the vessel all the sediment, fur, and woody fibers floating in the water.

By the use of wood the chilling of the steam by a cold surface is avoided and the formation of a vacuum rendered impossible.

In practice, the holes and channels never clog with impurities, and no delay is experienced in heating the water, as always arises when a bulky metal heater is employed.

By the use of my wooden heater a tank of fifty gallons can be warmed in four minutes less time than with the best lead heater, and the temperature raised to 210° with steam of the same pressure that would produce but 204° when applied in the lead heater. I therefore claim that the material used is the cause of the advantages specified, and the use of such a material, requiring novel and peculiar appliances to connect it to the supply-pipe when used for a heater, renders the use of wood something materially different from a mere substitution of one material for another in a case where the form remains unchanged.

The heater shown in Fig. 7 resembles in form the lead heater commonly employed, though not hollow like the latter; but it possesses none of the advantages of the other forms, in which the jets of steam are directed into the water at various angles, but simply discharges it, like the thin shell of a lead heater, in radial lines.

The great thickness employed in the wood affords a positive guide to the escaping steam, and directs it to any desired point, as a hole in thin material will not do, however it may be inclined at first, the holes in lead heaters assuming all sorts of forms as they corrode, and always discharging the steam at right angles to the surface of the metal.

I therefore claim and desire to secure by Letters Patent—

1. A jet-heater constructed of wood, substantially as and for the purpose set forth.

2. The combination of the body of the heater with the lead pipe C, the flange I, screws $a$ or bolts $b$, and solder $c$, substantially as and for the purpose set forth.

In testimony that I claim the foregoing as my own I hereto subscribe my name in presence of two witnesses.

WILLIAM HOWARTH.

Witnesses:
THOS. S. CRANE,
E. P. ROBERTS.